（12) United States Patent
Kramer et al.

(10) Patent No.: US 10,962,113 B2
(45) Date of Patent: Mar. 30, 2021

(54) PARKING LOCK FOR A MOTOR VEHICLE

(71) Applicant: Schaeffler Technologies AG & Co. KG, Herzogenaurach (DE)

(72) Inventors: Klaus Kramer, Lenkersheim (DE); Matthias Feuerbach, Wurzburg (DE); Markus Rost, Herzogenaurach (DE); Tobias Heumann, Nuremberg (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 0 days.

(21) Appl. No.: 16/332,955

(22) PCT Filed: Nov. 20, 2017

(86) PCT No.: PCT/DE2017/100988
§ 371 (c)(1),
(2) Date: Mar. 13, 2019

(87) PCT Pub. No.: WO2018/095476
PCT Pub. Date: May 31, 2018

(65) Prior Publication Data
US 2019/0271394 A1 Sep. 5, 2019

(30) Foreign Application Priority Data
Nov. 25, 2016 (DE) .......................... 102016223460.9

(51) Int. Cl.
F16H 63/34 (2006.01)
B60T 1/00 (2006.01)
F16D 63/00 (2006.01)

(52) U.S. Cl.
CPC .......... F16H 63/3425 (2013.01); B60T 1/005 (2013.01); F16D 63/006 (2013.01); F16H 63/3416 (2013.01)

(58) Field of Classification Search
CPC .. F16H 63/34; F16H 63/3416; F16H 63/3425; F16H 63/3433; B60T 1/005; F16D 63/006
See application file for complete search history.

(56) References Cited
U.S. PATENT DOCUMENTS 2,860,731 A * 11/1958 Hause ..................... B60T 1/005
188/69
4,635,780 A * 1/1987 Wiggen ................ F16F 15/129
192/204
(Continued)

FOREIGN PATENT DOCUMENTS

CN 102345736 2/2012
DE 802605 2/1951
(Continued)

Primary Examiner — David R Morris
Assistant Examiner — Lori Wu
(74) Attorney, Agent, or Firm — Volpe Koenig

(57) ABSTRACT

A parking lock (1) for a motor vehicle, wherein the parking lock (1) has a housing (21), a locking pawl (4) which is arranged such that it can be pivoted about a rotational axis (a) and has a pawl tooth (5) which is configured for engaging in a positively locking manner into a parking lock gear, an actuator (6) for actuating the locking pawl (4), with the result that it can be brought reversibly into engagement with the parking lock gear by way of the pawl tooth (5) of the locking pawl (4), and a movable transmission element which transmits the movement of the actuator (6) to the locking pawl (4). The parking lock (1) has a damping mechanism for the locking pawl or for the movable transmission element.

18 Claims, 2 Drawing Sheets

(56) References Cited

U.S. PATENT DOCUMENTS

| | | |
|---|---|---|
| 8,387,759 B2 | 3/2013 | Prix |
| 2008/0127772 A1 | 6/2008 | Sauter et al. |
| 2011/0162937 A1 | 7/2011 | Sauter |
| 2012/0111131 A1 | 5/2012 | Scheucher |
| 2014/0231213 A1 | 8/2014 | Isomura et al. |
| 2017/0088111 A1* | 3/2017 | Kirchner ............. F16H 63/3466 |
| 2019/0154149 A1* | 5/2019 | Gruber ................ F16H 63/3458 |

FOREIGN PATENT DOCUMENTS

| | | |
|---|---|---|
| DE | 10245951 | 4/2004 |
| DE | 10308040 | 9/2004 |
| DE | 10359327 | 7/2005 |
| DE | 102009030005 | 12/2010 |
| DE | 102009030027 | 12/2010 |
| DE | 102010053857 | 6/2012 |
| DE | 102011080498 | 2/2013 |
| EP | 0145848 | 6/1985 |
| GB | 676634 | 7/1952 |
| JP | H07144616 | 6/1995 |

\* cited by examiner

PARKING LOCK FOR A MOTOR VEHICLE

FIELD OF THE INVENTION

The invention relates to a parking lock for a motor vehicle, wherein the parking lock has: a housing, a locking pawl that is arranged so that it can pivot about an axis of rotation and has a pawl tooth that is constructed for the positive-fit engagement in a parking lock gear, an actuator for actuating the locking pawl, so that this can be brought into reversible engagement with the parking lock gear using its pawl tooth, and a moving transmission mechanism that transfers the movement of the actuator to the locking pawl.

BACKGROUND OF THE INVENTION

A parking lock according to the class is known from DE 10 2010 053 857 A1. Similar solutions are shown by DE 10 2011 080 498 A1 or JP H07-144 616 A. In the latter solution, a planetary roller transmission is used as the mechanical transmission element for transferring the movement of the actuator to the locking pawl. In this way, it is possible to realize relatively high transmission forces.

When parking a vehicle, for example, on an incline, the weight of the vehicle generates a force, dependent on the wheel diameter, the transmission ratio, and the radius of the locking gear (locking tooth arrangement), on the closed pawl and thus, in turn, on the parking lock mechanism. Thus, when unlocking the parking lock on an incline, this applied force must be overcome.

Thus, a parking lock according to the class might require a relatively large force for releasing the locking pawl, i.e., for bringing it into the unlocked position. This can be realized from the geometry between the pawl tooth and the recess in the locking tooth arrangement, namely by a corresponding back-cut angle. A high force can also be realized based on the friction relationships and the realized friction wedge.

The forces must be securely supported, on the other hand, the parking lock and the transmission must have the lightest possible construction. In particular, for high forces and restricted installation space, the moving parts of the parking lock hit the housing of the parking lock, which then transfers structure-borne sound. If the operator attempts to engage the parking lock above the rejection speed, a ratcheting/rattling sound is generated, and undesired vibrations propagate through the vehicle.

According to DE 102 45 951 A1, it is provided to reduce structure-borne sound by mounting a spring in the flow of forces. Due to the spring, the transmission element impacts the stop with a time delay. By this time delay, there is more time for the impact of the force impulse on the end stop, so that the structure-borne sound is already impeded in its production. A damping effect is not created by this arrangement. For rejection, when the parking lock is actuated at a speed that is too high, the transmission element periodically pulses against the end stop. Without a damping effect, this system would not draw off enough energy.

For decoupling from structure-borne sound, in US 2014/0 231 213 A1 it is proposed to arrange a plastic bushing or a plastic layer as a damping mechanism between the housing and the transmission mechanism. In this parking lock, the generation of structure-borne sound is not prevented, but instead by the insertion of a plastic layer, it is attempted to prevent its further propagation. This requires, on one hand, a plastic that is resistant to heat and oil and also extra costs in the shown assembly by threaded connections.

SUMMARY

The present invention is based on the objective of realizing a parking lock according to the class, which has a compact construction and eliminates the previously mentioned disadvantages.

The object is achieved by a parking lock having one or more features of the invention.

The parking lock according to the invention has a spring assembly for the locking pawl or for the moving transmission mechanism as a stop. The spring assembly can guarantee that during an actuation process, the moving parts are prevented from hitting the housing of the parking lock. The force impulse generated by a rejection movement of the locking pawl is, on one hand, delayed by the spring assembly. Therefore, more time is available for the counteracting impulse, so that the production of sound is prevented in advance. On the other hand, the spring assembly allows the springs to deform relative to each other and therefore also rub against each other. Due to this rubbing friction, the springs also perform a damping function.

In one embodiment, the end stop of the parking lock is formed by a deformable spring plate assembly that can dissipate the impulse by internal friction. The transmission mechanism is, for example, the locking pawl itself or a component actuating the locking pawl, such as a slide that guides rollers.

In the simplest embodiment, the spring assembly is constructed as a double spring plate. The springs are supported one on the other. They can have geometrically identical shapes. In another embodiment, one, some, or all spring plates are different from each other.

Because the spring assembly primarily cushions and damps only to a small extent, the damping effect of the spring assembly can be increased, in that the spring plates are coated with friction material, in order to increase the internal friction during deformation. For the same purpose, the individual spring plates can have a minimum distance from each other.

In the event of tight installation space and, due to the design, strong excitation of the vibrations of a slide of a parking lock during ratcheting or during rejection of the pawl at higher vehicle speeds, the free oscillation range of the slide unit in the prior art is not adequate, under some circumstances, which has the effect that the slide, during the ratcheting/rejection function, pulses at a "high" excitation frequency within the respective geometric end limits. For a design of the housing as an aluminum material, the aluminum can be used only to a limited extent as a stop, because this function can be performed only to a limited extent due to its strength and hardness. For a design of the housing as steel material, the steel can be used only to a limited extent as a stop, because there is no structure-borne sound decoupling or deformation and thus no dissipation of the energy. Therefore, in one construction of the invention, it is provided to use two or more coated spring plates from spring steel as an end stop, which decouples the structure-borne sound transmission from the steel slide to the aluminum housing, nevertheless can absorb the large stop forces and can also absorb the impulses due to deformation work and in the case of the coated design due to friction between the plates (for deformation) and thus damp the impulses.

The parking lock can be installed in different types of transmissions. They are suitable, for example, for motor vehicles with manual transmissions, with automated or automatic transmissions, or for transmissions of electric vehicles.

The parking lock can have its own housing as a parking lock housing. The parking lock housing then forms, with the transmission housing, either a joint overall housing, or the parking lock housing is arranged inside the transmission housing. Alternatively, the parking lock can be formed without its own housing, so that the housing for the parking lock is the transmission housing itself.

The dissipation of the support force of the locking pawl generated by the locking torque and the engagement angle of the pawl tooth of the locking pawl with the tooth arrangement of the parking lock gear can be realized in one embodiment by means of a roller assembly in the housing.

Two housing-side rollers can be supported by needle rollers for minimizing the friction. They form support rollers. The third roller that rolls on the locking pawl is a solid roller that experiences its radial support by the two support rollers located above.

The rollers are optionally integrated in a slide that functions as a guide housing. In one embodiment, the slide has two elongated side parts that are preferably constructed as punched sheet metal parts. Both side parts are connected by two transverse parts on the ends. The transverse parts are preferably also constructed as punched sheet metal parts. The side parts and the transverse parts can be riveted to each other.

In one advantageous embodiment, the slide has a drive tooth segment and guide rollers. The guide rollers are placed so that these are in the optimum flow of forces to the drive pinion.

The slide further has a compression spring that is guided on the drive tooth segment. It also holds the shafts of the support rollers and guides these in the axial direction.

The slide can optionally even be provided with end stops. The end stops can be used for training the system, for example, for the case that an electromotive drive is realized.

Alternatively or additionally, the parking lock can have additional damping mechanisms. For example, coatings can be provided by elastomers or the slide is displaced directly before the stop against a higher resistance—for example, by friction surfaces that slide one on the other.

The parking lock can have, for example, reinforcement for a roller that is formed from a hardened steel sheet. The reinforcement can reliably absorb the Hertzian pressures that occur due to the rollers. Between the reinforcement and the housing there can be, for example, a wedge-shaped elastomer that also damps.

As an additional damping mechanism, a sheet metal assembly, an encapsulated or non-encapsulated rubber element, or a fluid can be provided.

The parking lock according to the invention forms a robust, simple, compact, and friction-optimized support. It is constructed in an especially compact way when the distance of the slide from the spring assembly in the locked state of the parking lock is less than two, preferably one times the width of the pawl tooth.

DETAILED DESCRIPTION

Figure 1:
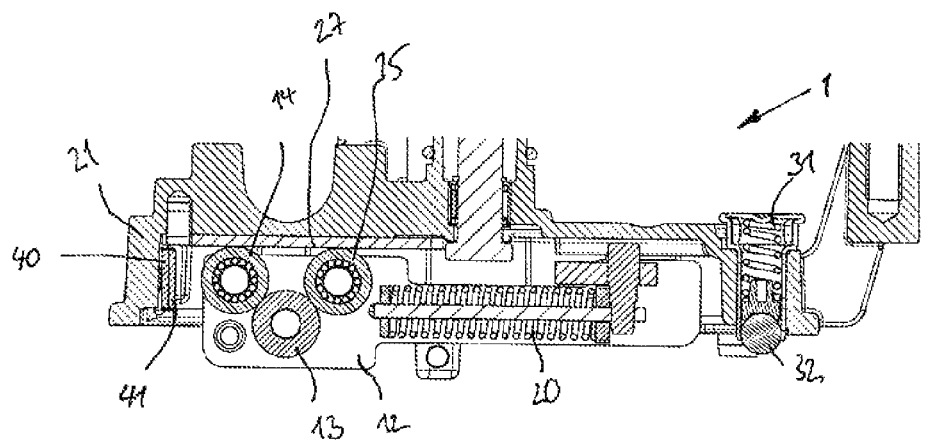
FIG. 1 the essential components of a first parking lock according to the invention without a slide and without a locking pawl in a longitudinal cross section, FIG. 2 the parking lock according to FIG. 1 with a slide and without a locking pawl in a perspective partial view, FIG. 3 the parking lock according to FIG. 2 with the additional locking pawl in a perspective view, and FIG. 4 a part of a second parking lock.
Figure 2:
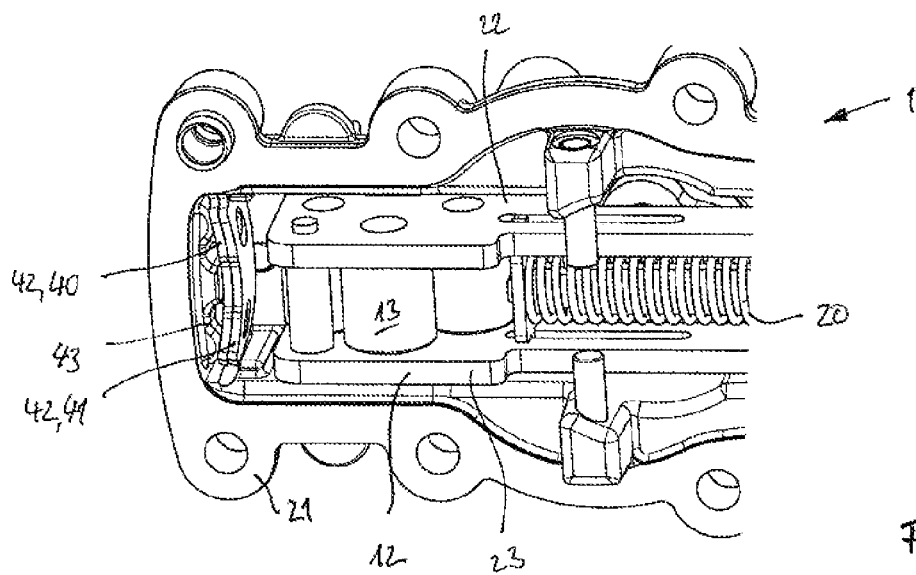
Figure 3:
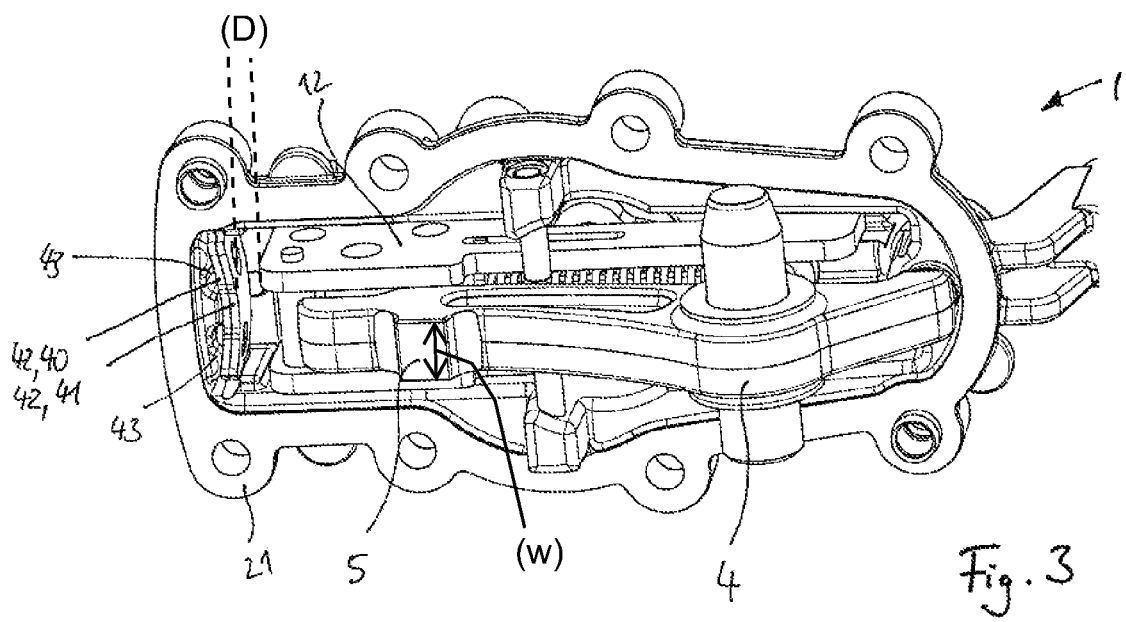

In FIGS. 1 to 4, two parking locks 1 are shown, wherein only the essential functional parts are shown. Covers and connecting parts of the arrangement are omitted for reasons of clarity. Below, the features relevant to the invention are described, which are based on a basic structural concept of a parking lock, as explained in detail in the applicant's publications, DE 10 2010 053 857 A1 and DE 10 2011 080 498 A1, named above. Reference is made to these previously known solutions explicitly to avoid repetitions with respect to the basic functioning principle of a parking lock.

In general, the parking lock 1 comprises a locking tooth arrangement 2 that has a number of recesses 3 on its periphery. The other central component of the parking lock 1 is a locking pawl 4 that is arranged so that it can pivot about an axis of rotation a.

Figure 4:
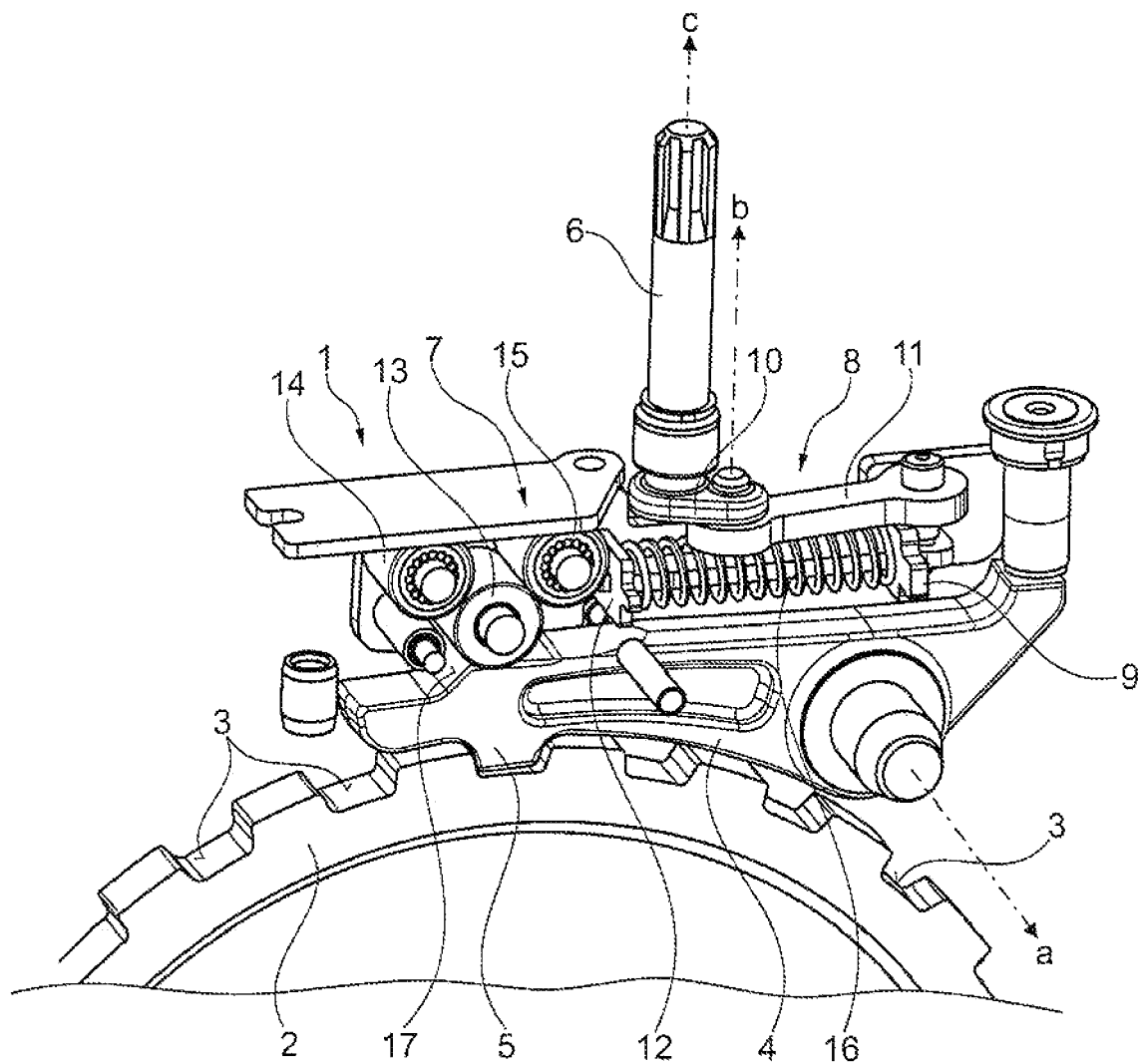

In FIG. 4, the locking pawl 4 is shown in a position pointed downward (in the direction toward the locking tooth arrangement 2), in which a pawl tooth 5 of the locking pawl 4 engages in one of the recesses 3 of the locking tooth arrangement 2 and thus locks the arrangement.

The locking or unlocking of the parking lock 1 is realized by an actuator 6 that is here shown as a shaft that rotates about an axis of rotation c for the locking or unlocking.

The transfer of the movement of the actuator 6 to the locking pawl 4 is realized by means of a transmission element 7. Like in the mentioned previously known solutions, the transmission element 7 comprises a linear displaceable slide 12 in which three rollers 13, 14, and 15 are supported.

The roller 13 can here contact a ramp 17 (see FIG. 1), which is constructed on the locking pawl 4. Thus, if the slide 12 carries out a linear movement, the locking pawl 4 pivots.

In the case of FIG. 4, the transmission element 7 comprises a crank drive 8 with which a part 9 of the transmission element 7 can be moved in a linear fashion. Between the part 9 and the slide 12 there is a rod 16, so that a linear movement of the part 9 is transferred to the slide 12. The rod 16 is enclosed by a compression spring 20 that pretensions the locking pawl 4 and holds it in the locked position. The crank drive 8 here has a crank 10 and a connecting rod 11 that are connected to each other in an articulated fashion. The crank 10 is locked in rotation with the actuator 6. The connecting rod 11 is connected to the part 9 in an articulated fashion.

If the actuator 6 is now operated, i.e., it performs a rotation about the axis c, the crank 10 moves accordingly and pulls the connecting rod 11 with it. Now, with the crank drive 8, for a small, equal torque on the actuator 6, a large force can be realized for unlocking—due to the properties of a crank drive—without reducing the total displacement path. The force then decreases for increasing displacement angle or path, which, in this case, however, is not a problem, because a large force is only required at the beginning until (in this case) the roller 13 has reached the high point of the ramp 17 of the locking pawl 4 and in this way the locking of the locking pawl is undone by the roller 13.

As can be seen from FIG. 4, the pivot axis b of the hinge-like connection between the crank 10 and the connecting rod 11 points in the vertical direction, while the axis of rotation a of the locking pawl 4 points in the horizontal direction. If the pivot axis b is projected onto the axis of rotation a, these two axes are aligned at a right angle to each other.

As can be seen especially from FIG. 1, the roller 13 rolls on the locking pawl 4, while the rollers 14, 15 roll on a reinforcement 27. The reinforcement 27 is constructed as a flat, hardened steel sheet and contacts, on the back side, the housing 21 of the parking lock 1.

In the illustrated embodiment, the two housing-side rollers 14, 15 are supported by needle rollers for minimizing the friction and form support rollers. The third roller 13 that rolls on the locking pawl is a solid roller.

The rollers are integrated in a slide 12. The slide 12 has two elongated side parts 22, 23 that are preferably constructed as stamped sheet-metal parts. Both side parts 22, 23 are connected on the ends by two transverse parts 24, 25. The transverse parts 24, 25 are also advantageously produced as stamped sheet-metal parts. The side parts 22, 23 and the transverse parts 24, 25 can be riveted to each other.

The slide 12 carries a drive tooth segment 26 and guide rollers 28. The guide rollers 28 are placed so that they are in the optimal flow of forces to the drive pinion of the actuator 6.

The box-like slide 12 further has the compression spring 20 that is guided on the drive tooth segment 26. It also holds the shafts of the support rollers 14, 15 and guides these in the axial direction.

A distance (D) of the slide 12 from the spring assembly 42 in a locked state of the parking lock is less than twice a width (W) of the pawl tooth 5.

Between the housing 21 of the parking lock 1 and the slide 12, two spring plates 40, 41 form, as spring assembly 42, an end stop for the slide 12 on the housing 21 or the locking pawl 4. The two spring plates 40, 41 are tensioned in the housing 21. They have a convex shape and can deform when the slide 12 contacts, so that they can convert its motion energy by deformation and thus internal friction into heat and thus form a damping mechanism. The two spring plates 40, 41 are spring-mounted in the present example on their side on a third spring plate 43.

LIST OF REFERENCE SYMBOLS

1 Parking lock
2 Locking tooth arrangement
3 Recess
4 Locking pawl
5 Pawl tooth
6 Actuator
7 Transmission element
8 Crank drive
9 Part of the transmission element
10 Crank
11 Connecting rod
12 Slide
13 Roller
14 Roller
15 Roller
16 Rod
17 Ramp
20 Compression spring
21 Housing
22 Side part
23 Side part
24 Transverse part
25 Transverse part
26 Drive tooth segment
27 Reinforcement
28 Guide roller
29 Pawl recess
30 Engagement mechanism
31 Blocking mechanism
32 Ball
40 First spring plate
41 Second spring plate
42 Spring assembly
43 Third spring plate
a Axis of rotation of the locking pawl
b Pivot axis of the connection between the crank and connecting rod
c Axis of rotation of the actuator

The invention claimed is:

1. A parking lock for a motor vehicle, the parking lock comprising:
a housing;
a locking pawl arranged to pivot about an axis of rotation relative to the housing, the locking pawl including a pawl tooth constructed for positive-fit engagement in a parking lock gear;
an actuator that actuates the locking pawl, so that the locking pawl is movable into reversible engagement with the parking lock gear with said pawl tooth;
a moving transmission mechanism that transfers movement of the actuator to the locking pawl; and
a spring assembly that acts as a stop for the locking pawl or for the moving transmission mechanism,
wherein the spring assembly is located between a slide and the housing.

2. The parking lock according to claim 1, wherein the moving transmission mechanism includes a roller that transfers the movement of the actuator to the locking pawl.

3. The parking lock according to claim 1, wherein the moving transmission mechanism has the slide that is displaceable in a linear fashion.

4. The parking lock according to claim 3, wherein a distance of the slide from the spring assembly in a locked state of the parking lock is less than twice a width of the pawl tooth.

5. The parking lock according to claim 1, wherein the spring assembly is arranged between the moving transmission mechanism and the housing.

6. The parking lock according to claim 1, wherein the spring assembly has two or more spring plates arranged one behind the other.

7. The parking lock according to claim 6, wherein at least two of the spring plates have a same shape and are arranged one directly behind the other.

8. The parking lock according to claim 6, wherein at least one of the spring plates has a shape deviating from one of the other spring plates.

9. The parking lock according to claim 6, wherein the spring plates are coated with friction material.

10. The parking lock according to claim 6, wherein the spring plates are spaced apart from each other by spring gaps.

11. A parking lock for a motor vehicle, the parking lock comprising:
a housing;
a locking pawl arranged to pivot about an axis of rotation relative to the housing, the locking pawl including a pawl tooth constructed for positive-fit engagement in a parking lock gear;
an actuator that actuates the locking pawl, so that the locking pawl is movable into reversible engagement with the parking lock gear with said pawl tooth, the actuator including an actuator shaft that is rotatable about an actuator axis;
a moving transmission mechanism that transfers movement of the actuator to the locking pawl, the moving transmission mechanism including a crank connected to the actuator shaft, a slide that drives the locking pawl, and a connecting rod connecting the crank to the slide; and
a spring assembly that acts as a stop for the locking pawl or for the moving transmission mechanism,
wherein slide is displaceable in a linear fashion and
a distance of the slide from the spring assembly in a locked state of the parking lock is less than twice a width of the pawl tooth.

12. The parking lock according to claim 11, further comprising a roller located on the slide that transfers movement of the actuator to the locking pawl.

13. The parking lock according to claim 11, wherein the spring assembly is located between the slide and the housing.

14. The parking lock according to claim 13, wherein the spring assembly comprises two or more spring plates.

15. The parking lock according to claim 13, wherein at least two of the spring plates have a same shape and are arranged one directly behind the other.

16. The parking lock according to claim 15, wherein the spring plates are coated with friction material.

17. The parking lock according to claim 15, wherein the spring plates are spaced apart from each other by spring gaps.

18. A parking lock for a motor vehicle, the parking lock comprising:
a housing;
a locking pawl configured to pivot relative to the housing;
an actuator that actuates the locking pawl;
a moving transmission mechanism that transfers movement of the actuator to the locking pawl, the moving transmission mechanism including a rod enclosed by a compression spring that pretensions the locking pawl; and
a spring assembly separate from the compression spring that acts as a stop for the moving transmission mechanism.

* * * * *